C. L. TRAPP & O. C. GEHRMAN.
METALLIC ROD PACKING.
APPLICATION FILED SEPT. 1, 1908.
965,255.
Patented July 26, 1910.
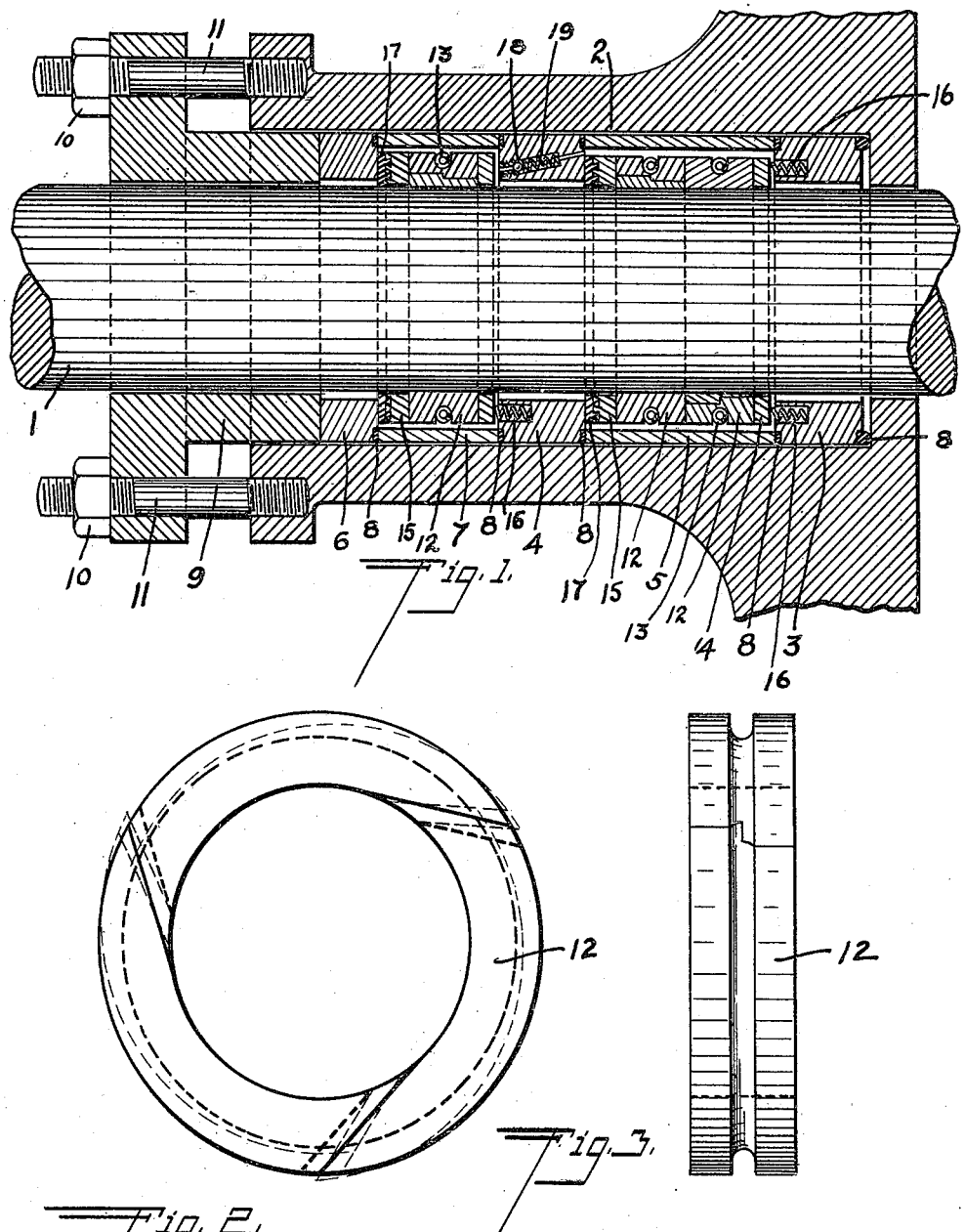
Charles L. Trapp
Otto C. Gehrman,
Inventors,
Witnesses.
Roy G. Kraz
C. R. McKay
By David O. Barnell,
Attorney.

UNITED STATES PATENT OFFICE.

CHARLES L. TRAPP, OF SOUTH OMAHA, AND OTTO C. GEHRMAN, OF OMAHA, NEBRASKA, ASSIGNORS OF ONE-FOURTH TO FRANK J. MEYERS, OF OMAHA, NEBRASKA.

METALLIC ROD-PACKING.

965,255.  Specification of Letters Patent.  Patented July 26, 1910.

Application filed September 1, 1908. Serial No. 451,246.

*To all whom it may concern:*

Be it known that we, CHARLES L. TRAPP and OTTO C. GEHRMAN, citizens of the United States, and residents, respectively, of South Omaha and Omaha, in the county of Douglas and State of Nebraska, have invented certain new and useful Improvements in Metallic Rod-Packing, of which the following is a specification.

Our invention relates to metallic rod-packing and it is the object thereof to provide a packing of this class especially adapted for use on ammonia compressors.

With this object in view, our invention consists, first, in the construction of the packing rings of which the segmentation is such that a single ring is sufficient to prevent leakage under ordinary conditions, and second, in the arrangement of the packing within a housing in such a manner that, of the two sets of packing employed, one of the same is not subjected to a pressure greater than the back pressure on the compressor, which in ordinary practice does not exceed thirty pounds per square inch.

Constructions embodying our invention are shown in the accompanying drawings in which—

Figure 1 is a sectional view of the packing, the section being taken longitudinally of the rod, Fig. 2 is an end elevation of one of the packing rings, and Fig. 3 is a side elevation of the same.

In carrying out our invention we provide two sets of packing which are arranged serially upon the rod 1 within the stuffing-box 2. The two sets of packing are inclosed within a housing which forms an outer and an inner compartment so that each set of packing is entirely separate from the other. The housing for the inner set of packing, or that nearest the cylinder, is formed by the rings 3 and 4 and the sleeve 5. The housing for the outer set of packing is formed by the rings 4 and 6 and the sleeve 7. Between the ring 3 and the bottom of the stuffing-box, and at each end of the sleeves 5 and 7 between the same and the rings 3, 4 and 6, are placed soft-metal gasket-rings 8. The outer ring 6 is engaged by the gland 9 and, by means of the nuts 10 working on the studs 11, said gland is forced into engagement with said ring 6. The various members of the housing are thus pressed into engagement with the gasket-rings 8 so that gas-tight joints are formed thereby and the gas which escapes from the cylinder around the rod is confined within the housing.

Each set of packing consists of one or more packing rings 12, an annular coil spring 13 encircling each packing ring, a follower-ring 14, and a facing-ring 15. The follower rings 14 are pressed yieldingly against the packing rings by means of coil springs 16 disposed in recesses in the housing-rings 3 and 4, as shown. The front portions 17 of the facing-rings 15, adjoining the rings 4 and 6, are formed of soft metal such as babbitt which is cast into dovetail grooves in the faces of the rings, as indicated.

The segmentation of the packing rings will be apparent from the Figs. 2 and 3. Each ring is divided into three or more like segments, the abutting end-faces of which are shouldered or offset transversely of the rod, the two portions of each face lying in parallel planes tangent to cylinders concentric with the rod and of a diameter not greater than that of the rod. The segments are held to the rod by the annular coil springs 13 which are retained in grooves formed in the peripheries of the rings, and said springs together with the pressure of the gas upon the segments force them in upon the rod to compensate wear. The movement of the segments in closing upon the rod will be apparent by reference to the dotted positions thereof in Fig. 2.

Referring to Fig. 1 it will be seen that the gas from the cylinder has free access to the inner compartment of the housing inside of the sleeve 5, but is prevented from reaching the outer compartment of the housing except by leakage through the inner set of packing. Should any of the gas leak through the inner set of packing it will enter the outer compartment of the housing and be prevented from further escape by the outer set of packing. In order that the pressure in the outer compartment of the housing may not be greater than the back pressure of the compressor, a check-valve is arranged in the ring 4 between the outer and inner compartments, said valve consisting of a ball 18 arranged in an inclined passage through the ring 4, said ball normally resting on a valve seat and being held thereon by a small coil spring 19. The valve being openable toward the inner compartment of the housing, whenever the pressure in the outer compartment becomes greater than the back pressure of the compressor the valve will be opened at the suction stroke of the compressor and the gas return through the passage to the inner compartment, the valve closing when the pressures have equalized.

Now, having described our invention, what we claim and desire to secure by Letters Patent is:

1. In a metallic rod-packing, a housing surrounding the rod and having two packing compartments formed therein, a set of packing arranged in each compartment of the housing, there being a passage connecting the outer compartment with the inner, and a check-valve in said passage arranged to open toward the inner compartment.

2. In a metallic rod-packing, a packing ring consisting of a plural number of segments having abutting end-faces shouldered only transversely to the rod, the portions of each face on opposite sides of the shoulder lying in planes parallel to each other and tangent to cylinders concentric with the rod and of a diameter slightly less than the rod, and means embracing the ring to hold the segments upon the rod.

3. In a metallic rod-packing, a housing surrounding the rod and consisting of alternate rings and sleeves, the said rings and sleeves being arranged to form an inner and an outer packing compartment, a set of packing arranged in each compartment of the housing, there being a passage connecting the compartments, and a valve arranged in said passage.

4. In a metallic rod-packing subjected to variable pressures, a housing consisting of alternating rings and sleeves arranged serially upon the rod, means for removably holding said rings and sleeves in engagement with each other, there being packing compartments formed in said housing one of which is exposed to the variable pressures, a set of packing arranged in each of said compartments, there being a passage connecting the compartments, and a valve in said passage, said valve being openable by the pressure in one compartment when the same exceeds the minimum pressure in the compartment exposed to the variable pressures.

5. In a metallic rod-packing, a housing consisting of separable portions surrounding the rod and forming two packing compartments therein adjoining the rod, a set of packing arranged in the inner of said compartments and exposed directly to variable pressures, a set of packing arranged in the outer compartment and exposed only to the pressure of gases leaking through the inner set of packing, there being a passage connecting the compartments, and a valve controlling the said passage whereby when the pressure in the outer compartment exceeds the pressure in the inner compartment the gas in the outer compartment may pass therefrom to the inner compartment.

6. In a metallic rod-packing, a packing ring consisting of a plural number of like segments having abutting end-faces shouldered only transversely to the rod, the portions of each face on opposite sides of the shoulder lying in planes substantially parallel with each other, the like portions of each of the end-faces lying in planes tangent to a cylinder concentric with the rod and of a diameter slightly less than the same, and means for holding the segments upon the rod.

In testimony whereof we have hereunto subscribed our names in the presence of two witnesses.

CHARLES L. TRAPP.
OTTO C. GEHRMAN.

Witnesses:
  D. O. BARNELL,
  ROY G. KRATZ.